US012345163B2

(12) United States Patent
Nesteroff et al.

(10) Patent No.: US 12,345,163 B2
(45) Date of Patent: Jul. 1, 2025

(54) TRAVEL STOP FOR A TIP CLEARANCE CONTROL SYSTEM

(71) Applicant: Rolls-Royce Corporation, Indianapolis, IN (US)

(72) Inventors: Michael Nesteroff, Indianapolis, IN (US); Mark E. Whitlock, Indianapolis, IN (US); Nathanael Cooper, Indianapolis, IN (US); Jonathan Acker, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 18/512,681

(22) Filed: Nov. 17, 2023

(65) Prior Publication Data

US 2025/0163821 A1 May 22, 2025

(51) Int. Cl.
*F01D 11/22* (2006.01)

(52) U.S. Cl.
CPC .......... *F01D 11/22* (2013.01); *F05D 2220/32* (2013.01); *F05D 2240/11* (2013.01); *F05D 2240/55* (2013.01)

(58) Field of Classification Search
CPC ....... F01D 11/22; F01D 11/20; F05D 2240/11
See application file for complete search history.

(56) References Cited

U.S. PATENT DOCUMENTS 3,085,398 A 4/1963 Ingleson
4,069,662 A 1/1978 Redinger, Jr. et al.
4,247,247 A 1/1981 Thebert
4,264,271 A 4/1981 Libertini
4,419,046 A 12/1983 Carlini
4,472,108 A 9/1984 Pask
4,683,716 A 8/1987 Wright et al.
4,844,688 A 7/1989 Clough et al.
5,017,088 A 5/1991 Miraucourt et al.
5,018,942 A 5/1991 Ciokajlo et al.
5,049,033 A 9/1991 Corsmeier et al.
5,116,199 A 5/1992 Ciokajlo
5,211,534 A 5/1993 Catlow
5,263,816 A 11/1993 Weimer et al.
5,344,284 A 9/1994 Delvaux et al.
6,273,671 B1 8/2001 Ress
6,401,460 B1 6/2002 Xia
6,435,823 B1 8/2002 Schroder (Continued)

FOREIGN PATENT DOCUMENTS

JP 02042197 A 2/1990
WO 2014130159 A1 8/2014

*Primary Examiner* — Michael L Sehn
(74) *Attorney, Agent, or Firm* — Barnes & Thornburg

(57) ABSTRACT

A compressor assembly for a gas turbine engine comprising an outer case, a shroud arranged circumferentially around the axis to direct compressed air through an impeller, and an actuator coupled with the outer case and the shroud to vary the position of the shroud axially relative to the outer case. The actuator includes a mount arm, an actuator body, and a travel stop. The mount arm is coupled with the outer case. The actuator body is coupled with the mount arm and the shroud to control axial movement of the shroud relative to the outer case. The travel stop is coupled to the mount arm and extends away from the mound arm and is configured to limit a forward most axial position of the shroud relative to the outer case.

17 Claims, 6 Drawing Sheets

(56) References Cited

U.S. PATENT DOCUMENTS 6,543,992 B2 4/2003 Webster
6,877,952 B2 4/2005 Wilson
6,935,836 B2 8/2005 Ress, Jr. et al.
7,079,957 B2 7/2006 Finnigan et al.
7,114,914 B2 10/2006 Gendraud et al.
7,125,223 B2 10/2006 Turnquist et al.
7,165,937 B2 1/2007 Dong et al.
7,189,057 B2 3/2007 Lee et al.
7,220,097 B2 5/2007 Boeck
7,326,027 B1 2/2008 Skoch et al.
7,341,426 B2 3/2008 Schwarz et al.
7,407,369 B2 8/2008 Schwarz et al.
7,448,849 B1 11/2008 Webster et al.
7,465,145 B2 12/2008 Kane
7,491,029 B2 2/2009 Pezzetti, Jr. et al.
7,654,791 B2 2/2010 Werner
7,686,569 B2 3/2010 Paprotna et al.
7,688,081 B2 3/2010 Webster
7,708,518 B2 5/2010 Chehab
7,824,151 B2 11/2010 Schwarz et al.
7,874,793 B2 1/2011 Razzell et al.
8,011,883 B2 9/2011 Schwarz et al.
8,047,773 B2 11/2011 Bruce et al.
8,087,880 B2 1/2012 Karafillis et al.
8,105,012 B2 1/2012 Anema
8,126,628 B2 2/2012 Hershey et al.
8,186,945 B2 5/2012 Bhatnagar et al.
8,256,228 B2 9/2012 O'Leary
8,272,835 B2 9/2012 Smith
8,296,037 B2 10/2012 Plunkett et al.
8,534,996 B1 9/2013 Pankey et al.
8,550,767 B2 10/2013 Horn et al.
8,555,477 B2 10/2013 Bates
8,602,724 B2 12/2013 Takahashi et al.
8,608,427 B2 12/2013 Bck
8,616,827 B2 12/2013 O'Leary
8,678,742 B2 3/2014 Klingels
8,721,270 B2 5/2014 Graefe et al.
8,734,090 B2 5/2014 Lewis
8,790,067 B2 7/2014 Mccaffrey et al.
8,894,358 B2 11/2014 Bacic
8,894,362 B2 11/2014 Fretwell
8,939,709 B2 1/2015 Nanukuttan et al.
8,939,715 B2 1/2015 Miller
8,944,756 B2 2/2015 Lagueux
8,961,115 B2 2/2015 Rhoden et al.
8,998,563 B2 4/2015 Rioux
9,097,133 B2 8/2015 Dong et al.
9,121,302 B2 9/2015 Duong et al.
9,212,667 B2 12/2015 Sun et al.
9,228,447 B2 1/2016 Mccaffrey
9,260,974 B2 2/2016 Hasting et al.
9,309,777 B2 4/2016 Webster et al.
9,316,111 B2 4/2016 Eleftheriou et al.
9,341,074 B2 5/2016 Schimmels et al.
9,353,641 B2 5/2016 Philippot
9,435,218 B2 9/2016 Casavant et al.
9,441,499 B2 9/2016 Casavant et al.
9,458,855 B2 10/2016 Dierksmeier et al.
9,476,690 B2 10/2016 Javelot et al.
9,488,060 B2 11/2016 Bowman
9,567,865 B2 2/2017 Jalbert et al.
9,587,507 B2 3/2017 Ottow
9,598,971 B2 3/2017 Hasnedl et al.
9,598,974 B2 3/2017 Gekht et al.
9,598,975 B2 3/2017 Uskert et al.
9,752,450 B2 9/2017 Duguay et al.
9,784,117 B2 10/2017 Duguay et al.
9,840,932 B2 12/2017 Ballard, Jr. et al.
9,874,105 B2 1/2018 Callaghan
9,915,163 B2 3/2018 Mccaffrey
9,951,643 B2 4/2018 Duguay
9,957,830 B2 5/2018 Mccaffrey et al.
10,018,067 B2 7/2018 Klasing et al.
10,053,999 B2 8/2018 Mccaffrey et al.
10,066,497 B2 9/2018 Duguay
10,087,772 B2 10/2018 Sun et al.
10,113,556 B2 10/2018 Moniz et al.
10,138,752 B2 11/2018 Schilling
10,184,348 B2 1/2019 Carlucci et al.
10,227,879 B2 3/2019 Moniz et al.
10,301,961 B2 5/2019 Davis et al.
10,309,246 B2 6/2019 Miranda
10,309,409 B2 6/2019 Nesteroff et al.
10,309,410 B2 6/2019 Ottow et al.
10,316,684 B2 6/2019 Duguay
10,316,685 B2 6/2019 Davis et al.
10,316,686 B2 6/2019 Hudson et al.
10,323,535 B2 6/2019 Davis et al.
10,323,536 B2 6/2019 Hill
10,329,940 B2 6/2019 Ballard, Jr. et al.
10,352,329 B2 7/2019 Nesteroff et al.
10,358,933 B2 7/2019 Moxon
10,364,694 B2 7/2019 Ribarov et al.
10,364,696 B2 7/2019 Virkler
10,370,999 B2 8/2019 Blaney et al.
10,371,050 B2 8/2019 Iwrey
10,393,149 B2 8/2019 Mondal et al.
10,400,620 B2 9/2019 Ribarov et al.
10,408,226 B2 9/2019 Ottow et al.
10,415,417 B2 9/2019 Mccaffrey
10,415,419 B2 9/2019 Sun et al.
10,415,421 B2 9/2019 Arnold et al.
10,428,675 B2 10/2019 Szarvasy
10,458,429 B2 * 10/2019 Nesteroff ................ F04D 17/10
10,962,024 B2 * 3/2021 Nesteroff .............. F04D 29/622
2008/0134659 A1 6/2008 Schwarz et al.
2011/0002774 A1 1/2011 Karafillis et al.
2013/0034425 A1 2/2013 Biscay et al.
2014/0017600 A1 1/2014 Brandt et al.
2016/0084101 A1 3/2016 Mccaffrey
2016/0123172 A1 5/2016 Mondal et al.
2016/0305269 A1 10/2016 Blaney et al.
2016/0312644 A1 10/2016 Blaney et al.
2016/0369644 A1 12/2016 Blaney et al.
2017/0108004 A1 4/2017 Schuldt et al.
2017/0175750 A1 6/2017 Mcmanus
2017/0306785 A1 10/2017 Rioux et al.
2017/0342996 A1 11/2017 Nesteroff et al.
2018/0023412 A1 1/2018 Rizzi et al.
2018/0112550 A1 4/2018 Dierksmeier et al.
2019/0010822 A1 1/2019 Mccaffrey et al.
2019/0010823 A1 1/2019 Sun et al.
2019/0078459 A1 3/2019 Eastwood et al.
2019/0085710 A1 3/2019 Van Der Merwe et al.
2019/0128286 A1 5/2019 Skertic
2019/0195081 A1 6/2019 Kim
2019/0242303 A1 8/2019 Menheere et al.

* cited by examiner

TRAVEL STOP FOR A TIP CLEARANCE CONTROL SYSTEM

FIELD OF THE DISCLOSURE

The present disclosure relates generally to turbine engines with a centrifugal compressor, and more specifically to shroud assemblies for centrifugal compressors.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

One type of compressor used in turbine machines, such as a gas turbine engines, is a centrifugal compressor. In some turbine machines, centrifugal compressors are used as the final stage in a multi-stage compressor section in a gas turbine engine. Typical centrifugal compressors include an impeller for compressing air and a shroud arranged around the impeller to direct the air through the compressor. It may be desirable to minimize a gap between the impeller and the shroud to reduce leakage and improve efficiency of the compressor while providing clearance to avoid contact between the impeller and the shroud. It may be desirable to limit the size of the gap during some engine operating conditions and while the gas turbine engine is not being used in operation.

SUMMARY

The present disclosure may comprise one or more of the following features and combinations thereof.

A compressor assembly for a gas turbine engine may include: an impeller arranged around an axis and configured to rotate about the axis to provide compressed air, a shroud arranged circumferentially around the impeller to direct the compressed air through the impeller, the shroud being spaced axially and radially apart from the impeller to define a gap therebetween, an outer case that is fixed relative to the axis, and an air piston actuator coupled with the outer case and the shroud to selectively vary a position of the shroud axially relative to the impeller, the air piston actuator includes a mount arm, an actuator body, and a travel stop, the mount arm being fixedly coupled with the outer case, the actuator body includes bellows coupled with the mount arm and the shroud and configured to move the shroud axially relative to the impeller and adjust a size of the gap, and the bellows defines a chamber adapted to be selectively pressurized and depressurized to control axial expansion and contraction of the bellows, wherein the travel stop is coupled with the mount arm and extends axially into the chamber defined by the bellows and has an axial terminal end configured to engage the bellows and limit the contraction of the bellows beyond a predetermined axial distance so that a maximum size of the gap between the shroud and the impeller is not exceeded when the chamber is depressurized.

In some embodiments, the travel stop comprises a bolt that is threadedly coupled with the mount arm and an axial length of the bolt is sized such that the axial terminal end of the bolt is located at a desired axial location relative to the outer case.

In some embodiments, the bolt includes a bolt shank and a bolt head, the bolt shank extends through the mount arm and into the chamber and is coupled to the mount arm, the bolt head engages the mount arm and positions the bolt axially, and the bolt shank further defines the axial terminal end of the bolt that engages the bellows in response to the chamber being depressurized.

In some embodiments, the travel stop further includes a shim positioned between the bolt head and the mount arm to adjust an axial location of the axial terminal end of the bolt.

In some embodiments, the travel stop includes a boss that extends axially away from the mount arm into the chamber and wherein the mount arm and the boss are integrally formed.

In some embodiments, the actuator body further includes a mount flange coupled with the bellows, the mount flange extends axially aft away from the bellows and couples with the shroud to couple the air piston actuator with the shroud.

In some embodiments, the bellows includes an outer segment and an inner segment that cooperate to form the chamber, the inner segment is U shaped when viewed circumferentially with a forward axial surface and an aft axial surface which move axially away from or towards each other as the chamber is selectively pressurize and depressurized respectively, and the outer segment is an inverted U shape when viewed circumferentially with a forward axial surface and an aft axial surface which move axially away from or towards each other as the chamber is selectively pressurize and depressurized respectively.

According to another aspect of the present disclosure, a compressor assembly for a gas turbine engine may comprise: an outer case that is fixed relative to an axis, a shroud arranged circumferentially around the axis to direct compressed air through an impeller, and an actuator coupled with the outer case and the shroud to vary a position of the shroud axially relative to the outer case, the actuator includes a mount arm, an actuator body, and a travel stop, the mount arm coupled with the outer case, the actuator body coupled with the mount arm and the shroud, the actuator body defines a chamber adapted to be selectively pressurized and depressurized to control axial movement of the shroud relative to the outer case, and the travel stop is coupled to the mount arm and extends away from the mount arm and configured to limit a forward most axial position of the shroud relative to the outer case.

In some embodiments, the actuator body includes a bellows configured to expand and contract in response to the actuator body being pressurized and depressurized.

In some embodiments, the bellows includes an outer segment and an inner segment that cooperate to form the chamber, the inner segment is U shaped when viewed circumferentially with a forward axial surface and an aft axial surface which move axially away from or towards each other as the chamber is selectively pressurize and depressurized respectively, and the outer segment is an inverted U shape when viewed circumferentially with a forward axial surface and an aft axial surface which move axially away from or towards each other as the chamber is selectively pressurize and depressurized respectively.

In some embodiments, the travel stop engages the actuator body when the chamber is depressurized to limit the forward most axial position of the shroud.

In some embodiments, the travel stop extends axially through the mount arm and into the chamber to engage the actuator body when the chamber is depressurized to limit the forward most axial position of the shroud.

In some embodiments, the travel stop may comprise a plurality of bolts, each bolt comprises a bolt shank, a bolt head, and a terminal end, the bolt shank extends through the mount arm and into the chamber and is coupled to the mount arm, the bolt head engages the mount arm and positions the bolt axially, and the terminal end of the bolt engages the bellows when the chamber is depressurized to limit the forward most axial position of the shroud.

In some embodiments, each of the plurality of bolts may further comprise a shim, the shim is trapped between the bolt head and the mount arm and positions the bolt axially such that the terminal end of the bolt engages the bellows when the chamber is depressurized to limit the forward most axial position of the shroud.

In some embodiments, the travel stop may comprise a boss that extends axially away from the mount arm into the chamber and wherein the mount arm and the boss are integrally formed.

In some embodiments, the actuator body includes an air piston.

According to another aspect of the present disclosure, a method of assembling a compressor shroud assembly may comprise: providing a compressor assembly that includes an outer case arranged circumferentially around an axis and an actuator coupled with the outer case and including an actuator body and a travel stop, pressurizing the actuator body to cause the actuator body to expand, depressurizing the actuator body to contract the actuator, and engaging the actuator body with the travel stop in response to the actuator body contracting to a predetermined location such that travel stop limits the contraction of the actuator body.

In some embodiments, the method may further comprise, prior to the pressurizing step, inserting travel stop bolts through the actuator body.

In some embodiments, the method may further comprise, arranging the outer case and the shroud assembly around an impeller, measuring a size of a gap between the impeller and the shroud assembly, and adjusting the gap by inserting shims between the travel stop bolts.

In some embodiments, the method may further comprise, arranging the outer case and shroud assembly around an impeller, measuring a size of a gap between the impeller and shroud assembly, and adjusting the gap removing the travel stop bolts and inserting new travel stop bolts with a different terminal end axial location.

These and other features of the present disclosure will become more apparent from the following description of the illustrative embodiments.

DETAILED DESCRIPTION OF THE DRAWINGS

Figure 1:
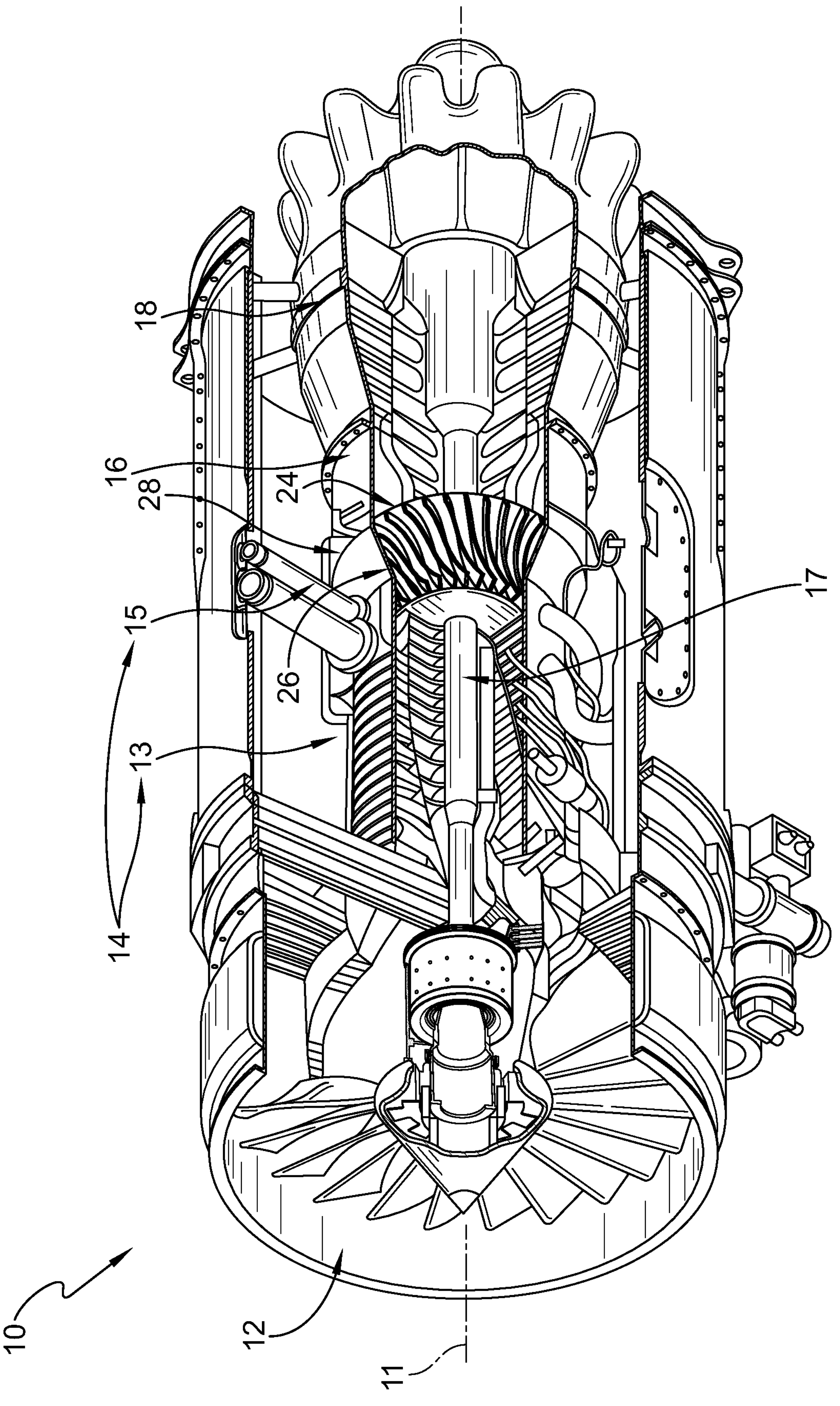
FIG. 1 is a schematic and cut-away view of a gas turbine engine comprising a fan, a compressor section having an axial compressor and a centrifugal compressor, a combustor, and a turbine section.

For the purposes of promoting an understanding of the principles of the disclosure, reference will now be made to a number of illustrative embodiments illustrated in the drawings and specific language will be used to describe the same.

An illustrative gas turbine engine 10 includes a fan 12, a compressor 14, a combustor 16 fluidly coupled to the compressor 14, a turbine 18 fluidly coupled to the combustor 16 as shown in FIG. 1. The illustrative compressor 14 comprises an axial compressor 13 and a centrifugal compressor 15 downstream of the axial compressor 13 as shown in FIG. 1.

Figure 2:
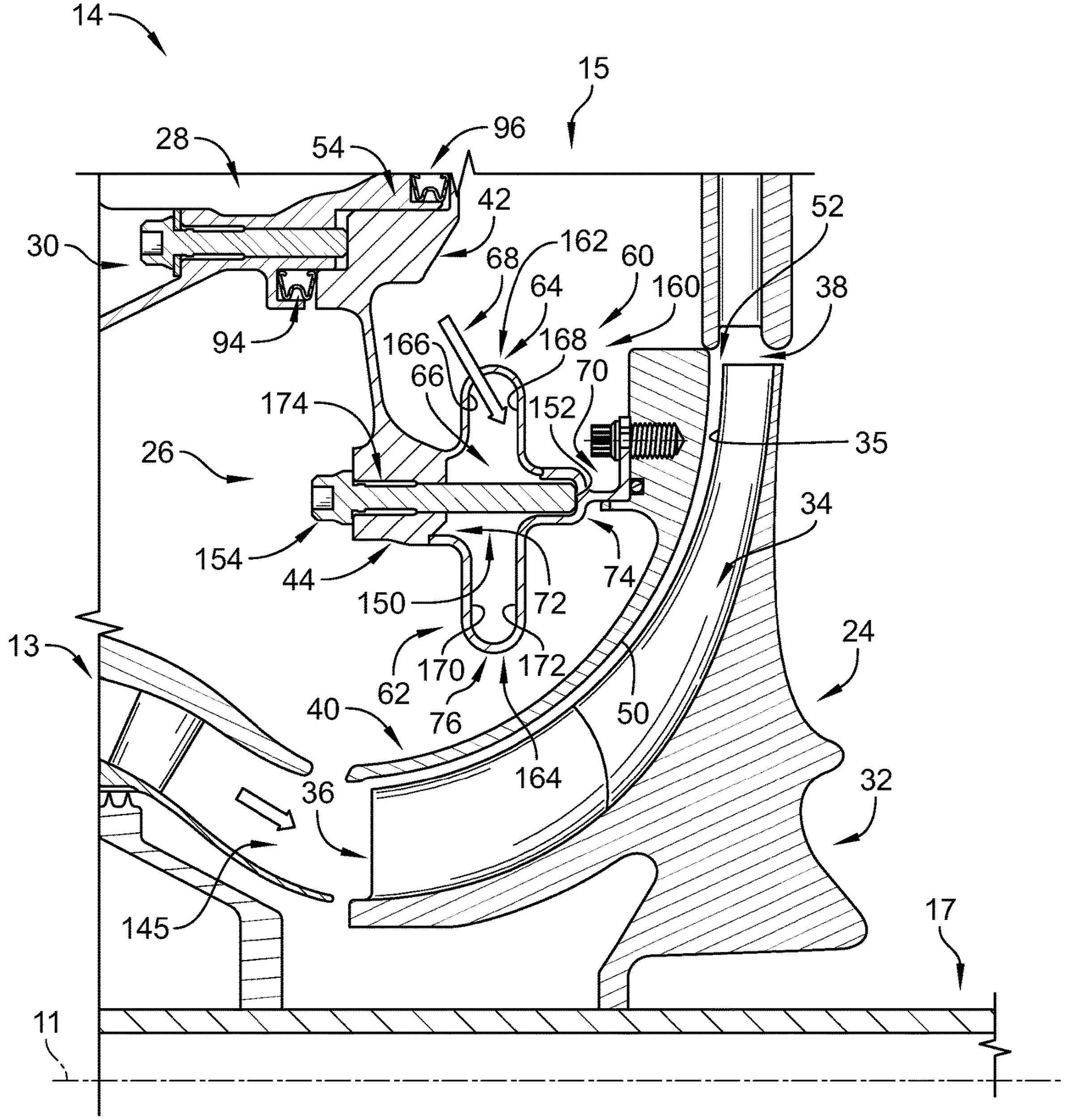
FIG. 2 is a schematic and sectional view of a portion of the centrifugal compressor assembly of FIG. 1 showing the compressor assembly having an impeller configured to compress air, a shroud assembly arranged around the impeller, an outer case coupled with the shroud assembly, and a clearance control system with an air piston having a plurality of stop bolts to limit the axial position of the shroud during engine start up and shut down.
Figure 3:
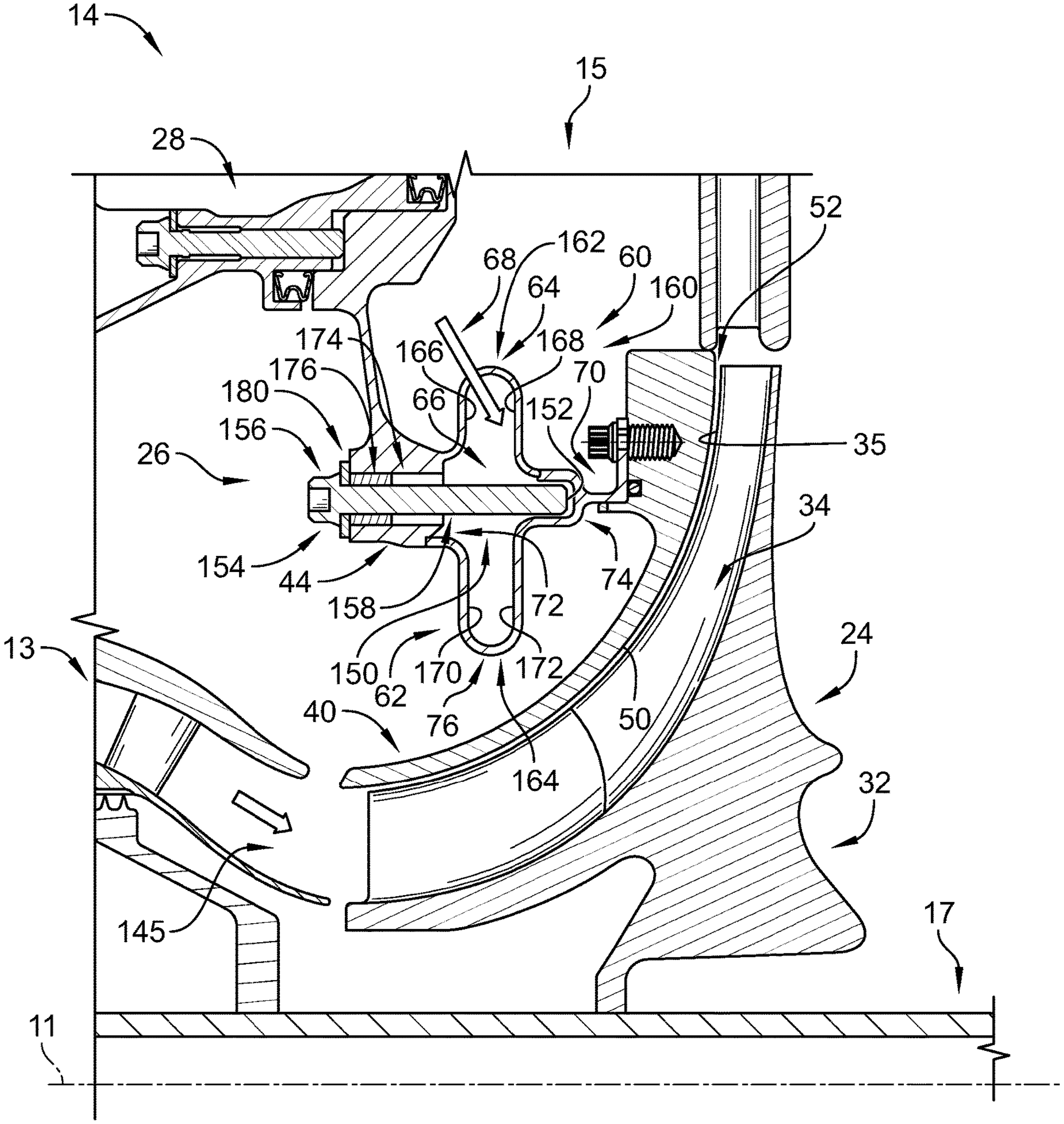
FIG. 3 is a schematic and sectional view of the portion of the centrifugal compressor of FIG. 2 showing the clearance control system active during operation of the gas turbine engine whereby the air piston is expanded and the shroud assembly is moved away from the plurality of stop bolts.
Figure 4:
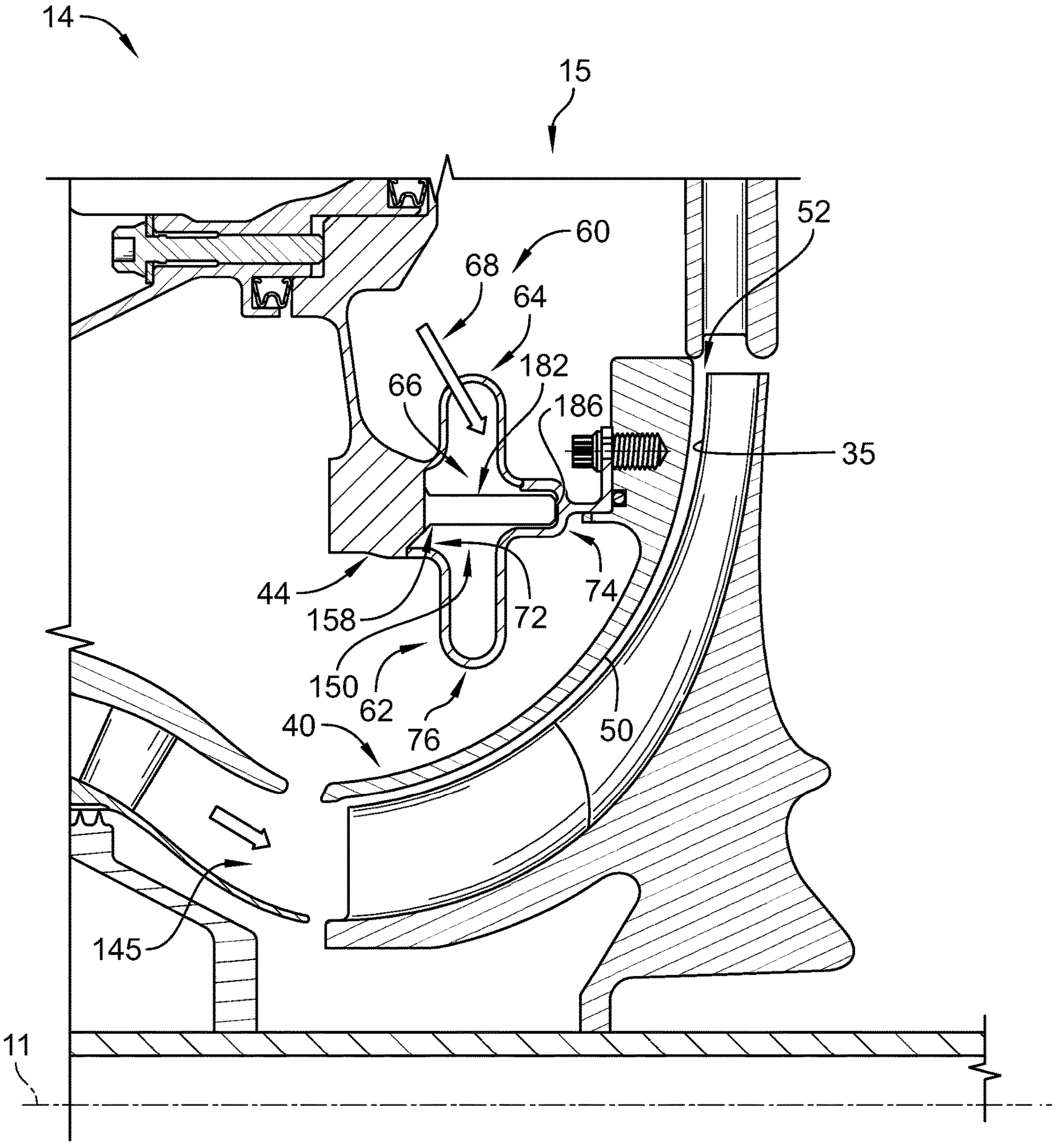
FIG. 4 is another schematic and sectional view of a portion of the centrifugal compressor assembly of FIG. 1 showing the compressor assembly having an impeller configured to compress air, a shroud assembly arranged around the impeller, an outer case coupled with the shroud assembly, and a clearance control system with an air piston having a plurality of bosses to limit the axial position of the shroud during engine start up and shut down.
Figure 5:
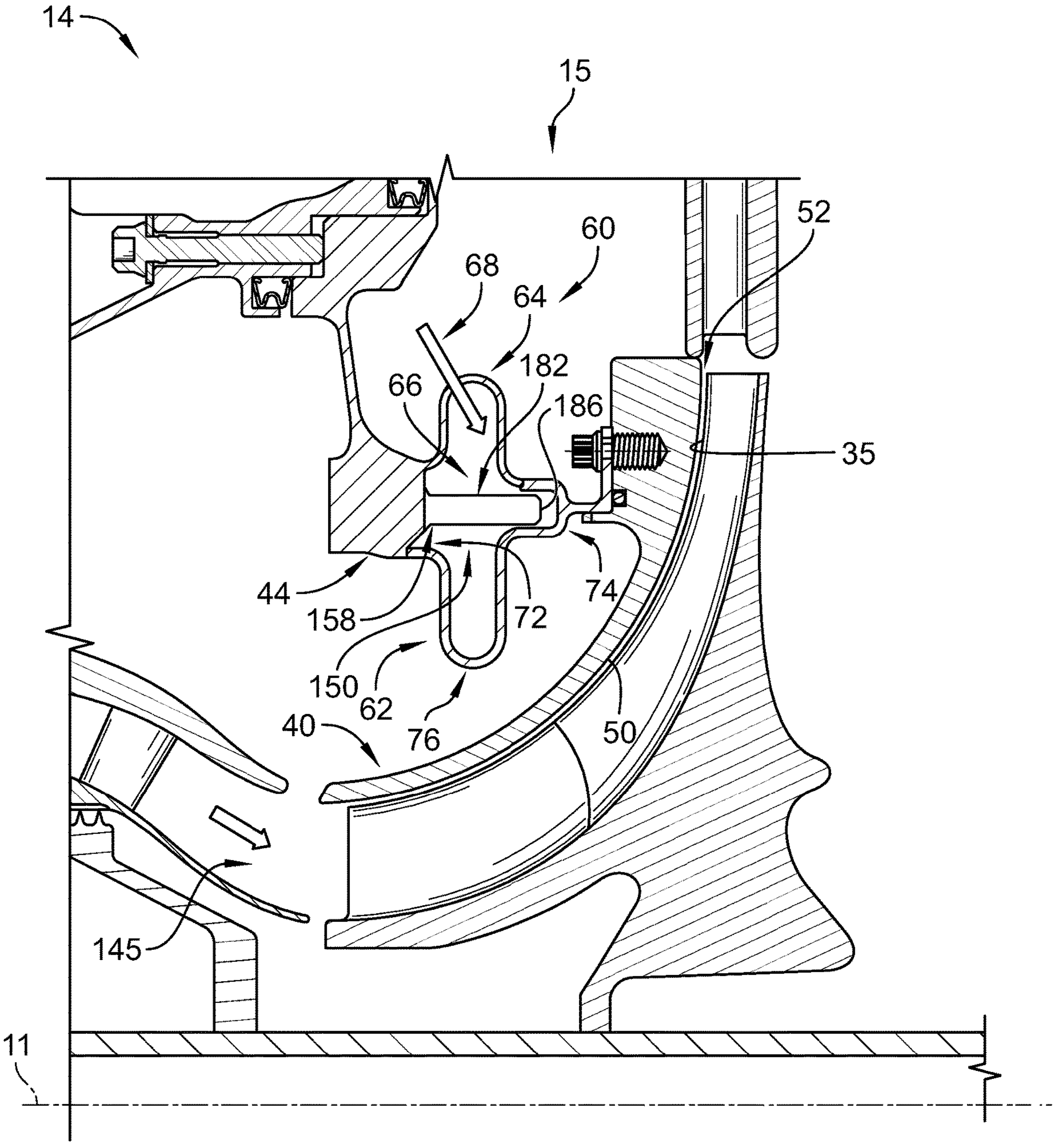
FIG. 5 is a schematic and sectional view of the portion of the centrifugal compressor assembly FIG. 4 showing the clearance control system active during operation of the gas turbine engine whereby the air piston is expanded and the shroud assembly is moved away from the plurality of bosses.

The centrifugal compressor 15 comprises an impeller 24, a shroud assembly 26, and an outer case assembly 28 as shown in FIGS. 1 and 2. The shroud assembly 26 of the present disclosure includes an impeller shroud 40 and an actuator 62 having a plurality of travel stops 150. The travel stops 150 may include a plurality of stop bolts 154, as shown in FIGS. 2 and 3, and/or a plurality of locating bosses 182, as shown in FIGS. 4 and 5, that allow for selectively adjusting the max forward axial location of the impeller shroud 40 of the shroud assembly 26 relative to the outer case assembly 28 and impeller 24 to set a max impeller tip clearance 52 between the impeller shroud 40 and the impeller 24. This may be beneficial during the gas turbine engine 10 start up and shut down by limiting the max impeller tip clearance 52 and thus making the gas turbine engine 10 more controllable during the gas turbine engine 10 start up and shut down conditions. The illustrative embodiments include stop bolts 154 and/or locating bosses 182; however, it is appreciated that travel stops 150 may include alternative structures that are rigid and provide an axial limit to the movement of the impeller shroud 40.

The fan 12 is driven by the turbine 18 through the shaft 17 of the gas turbine engine 10 and provides thrust for propelling an aircraft by forcing air through the gas turbine engine 10 as suggested in FIG. 1. The compressor 14 compresses some of the air from the fan 12. In the illustrative embodiment, this air is first compressed to an intermediate pressure by the axial compressor 13 and then further compressed to a higher pressure by the centrifugal compressor 15. The centrifugal compressor 15 delivers the high pressure air to the combustor 16. The combustor 16 mixes fuel with the high pressure air and ignites the fuel to produce hot, high pressure combustion products. The hot, high pressure combustion products of the combustion reaction in the combustor 16 are directed into the turbine 18 to cause the turbine 18 to rotate about an engine axis 11 of the gas turbine engine 10. The turbine 18 extracts mechanical work from the hot, high pressure combustion products to drive the compressor 14 and the fan 12 through the shaft 17 of the gas turbine engine 10.

Referring again to FIGS. 2 and 3, the impeller 24 is arranged around the engine axis 11 and configured to rotate about the engine axis 11 to compress the air received from the axial compressor 13 as suggested in FIG. 2. The impeller 24 includes an impeller disk 32, and a plurality of impeller blades 34 extending radially outward from the impeller disk 32. The radially outward surface of each of the plurality of impeller blades 34 constitutes an impeller blade tip 35. The impeller disk 32 is coupled to the shaft 17 which, in turn, is coupled to the turbine 18. The impeller disk 32 rotates the plurality of impeller blades 34 around the engine axis 11. The plurality of impeller blades 34 are configured to receive air from the axial compressor 13 at an axially forward position 36 at an inlet pressure, and eject the air at an axial aft and radially outward position 38 at an exit pressure which is greater than the inlet pressure. In some embodiments, the axial compressor 13 is omitted and the plurality of impeller blades 34 receive a portion of fan 12 air or ambient air.

As shown in FIG. 2, the shroud assembly 26 extends circumferentially around the impeller 24 to direct the compressed air through the impeller 24. The shroud assembly 26 includes an impeller shroud 40, a case mount 42 and a shroud body 44. The impeller shroud 40 confronts the impeller 24 to direct the compressed air through the impeller 24 in between the plurality of impeller blades 34 and impede the compressed air from passing over the plurality of impeller blade tips 35. The case mount 42 couples the shroud assembly 26 to the outer case assembly 28 and positions the impeller shroud 40 circumferentially about the engine axis 11 and axially along the engine axis 11. The shroud body 44 couples the impeller shroud 40 to the case mount 42.

As shown in FIG. 2, the outer case assembly 28 is configured to support the shroud assembly 26 at a desired axial location relative to the impeller 24 and position the shroud assembly 26 around the engine axis 11. The outer case assembly 28 comprises an outer case 54, a plurality of locating bolt assemblies 30, an inner seal 94 and an outer seal 96. The outer case 54 extends circumferentially around the engine axis 11 and keeps the high pressure gas from escaping the gas turbine engine 10 as it passing through the axial compressor 13 and centrifugal compressor 15.

The impeller shroud 40 comprises a radially inward surface 50 that confronts the impeller blade tips 35. The distance between the radially inward surface 50 and the impeller blade tips 35 is the impeller tip clearance 52. During the gas turbine engine 10 operation, thermal and mechanical forces act on various components of the centrifugal compressor 15 causing variations in the impeller tip clearance 52. For most operating conditions, the impeller tip clearance 52 is larger than desired for the most efficient operation of the centrifugal compressor 15. This larger than desired impeller tip clearance 52, avoids the impeller blade tips 35 from impinging the radially inward surface 50 of the impeller shroud 40, but also allows higher than desired air leakage around the impeller blade tips 35. In order to improve efficiency of the centrifugal compressor 15 during the gas turbine engine 10 operation, it is desired to minimize the impeller tip clearance 52 without the impeller blade tips 35 impinging the radially inward surface 50 of the impeller shroud 40.

Figure 6:
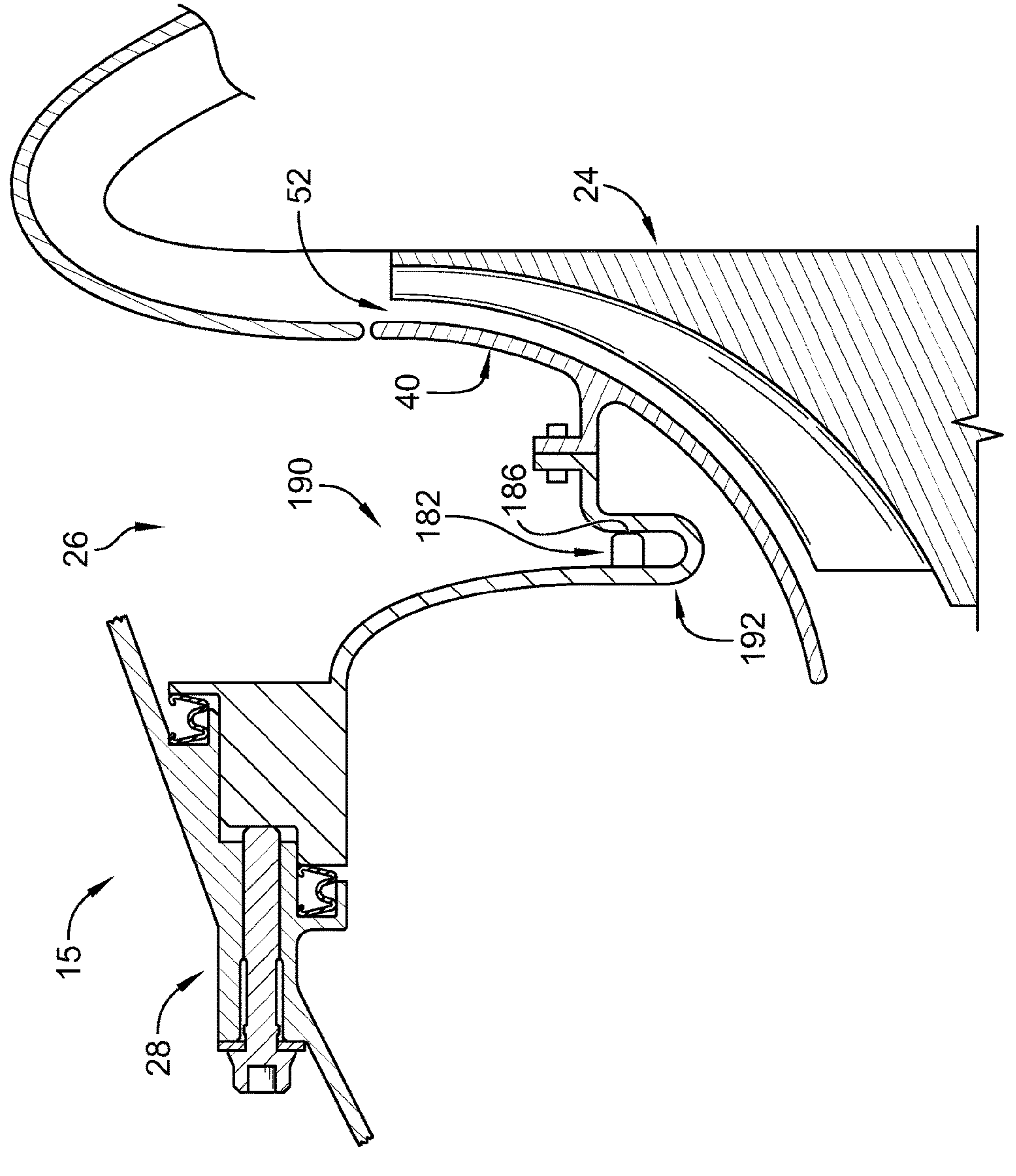
FIG. 6 is a schematic and sectional view of another centrifugal compressor showing the compressor assembly having an impeller configured to compress air, a shroud assembly arranged around the impeller, an outer case coupled with the shroud assembly, and a passive clearance control system with a plurality of bosses to limit the axial position of the shroud during engine start up and shut down.

The shroud body 44 comprises a clearance control system 60 to dynamically move the impeller shroud 40 axially relative to the impeller blade tips 35 to maintain the desired impeller tip clearance 52 during the gas turbine engine 10 operation as suggested by a difference in the size of the impeller tip clearance 52 shown in FIGS. 2 and 3. The clearance control system 60 comprises an actuator 62 to dynamically move the impeller shroud 40 axially to maintain the desired impeller tip clearance 52 during the gas turbine engine 10 operation and the travel stops 150 to prevent the impeller shroud 40 from traveling further than desired in the axially forward direction as the gas turbine engine 10 shuts down and starts up. In other embodiments, the travel stops 150 may be used with a passive tip clearance control system 190 in place of the dynamic actuator 62 of the present embodiment as shown in FIG. 6.

During the gas turbine engine 10 start up and shutdown, the gas turbine engine 10 may experience rapid changes in operating conditions which may lead to some of the gas turbine engine 10 components experiencing higher or lower rates of heating up or cooling down. For example, components adjacent to the engine flowpath 145 may have higher rates of heating up and cooling down during the gas turbine engine 10 start up and shut down, respectively. Conversely, the gas turbine engine 10 components located further away from the engine flowpath 145 may have a lower rate of heating up and cooling down during the gas turbine engine 10 start up and shut down, respectively. During these conditions, the gas turbine engine 10 start up and shut down, the clearance control system 60 may allow the impeller tip clearance 52 to open to a relatively large extent. The travel stops 150 are arranged to engage the impeller shroud 40 (or other structure coupled thereto) to prevent the impeller shroud 40 from traveling further forward in the axial direction than desired and thus opening up the impeller tip clearance 52 more than desired during these gas turbine engine 10 start up and shut down conditions.

In the illustrative embodiment, as shown in FIGS. 2 and 3, the actuator 62 comprises an air piston 64 to dynamically move the impeller shroud 40 axially. The air piston 64 comprises a chamber 66 adapted to receive actuation air 68 from an engine control system (not shown) and an aft extending mounting arm 70 which couples the impeller shroud 40 to the shroud assembly 26. The chamber 66 comprises a forward rigid member 72, an aft rigid member 74, a central flex member 76 disposed between the forward rigid member 72 and the aft rigid member 74 and a plurality of travel stops 150. The plurality of travel stops 150 include a plurality of stop bolts 154 in the embodiment of FIGS. 2 and 3.

An engine control system of the gas turbine engine 10 supplies the actuation air 68 to the chamber 66 of the air piston 64 through one or more conduits located circumferentially around the air piston 64. The one or more conduits may extend through the outer case assembly 28 and connect to the chamber 66 to supply the actuation air 68 to the air piston 64. The actuation air 68 may be supplied to the control system from the gas turbine engine 10 by being pulled from either the combustor 16 or turbine 18. In another embodiment, the actuation air 68 may be supplied to the control system from a source external of the gas turbine engine 10.

The central flex member 76 of the chamber 66 may comprise one or more sets of bellows 160. The sets of bellows 160 include an outer bellows segment 162 and an inner bellows segment 164. The outer bellows segment 162 may be an inverted U shape when viewed circumferentially about the engine axis 11 and comprises at least one forward outer axial surface 166 and at least one aft outer axial surface 168 which move axially towards each other when the actuation air 68 pressure decreases and move axially away from each other when the actuation air 68 pressure increases. The inner bellows segment 164 may be a U shape when viewed circumferentially around the engine axis 11 and comprises at least one forward inner axial surface 170 and at least one aft inner axial surface 172 which move axially towards each other when the actuation air 68 pressure decreases and move axially away from each other when the actuation air 68 pressure increases. The bellows 160 may be sized such that the bellows 160 contract a relatively large amount when the bellows 160 are not-pressurized (during engine 10 off condition, for example) and the impeller tip clearance 52 may be larger than desired. The plurality of travel stops 150 of the present disclosure provide an axial limit to the contraction of the bellows 160 and the location of the impeller shroud 40 and, thus, the size of the impeller tip clearance 52.

The plurality of travel stops 150 extend into the chamber 66 of the air piston 64 from the forward rigid member 72 and comprise a terminal end 152 as shown in FIG. 3. The terminal end 152 of each of the plurality of travel stops 150 may be in contact with the aft rigid member 74 of the air piston 64 when the gas turbine engine 10 is in the cold build state, not operating, or during certain gas turbine engine 10 operating conditions as shown in FIG. 2. As the gas turbine engine 10 starts up and the actuation air 68 increases pressure in the chamber 66, the central flex member 76 flexes and moves the aft rigid member 74 away from the terminal end 152 of the plurality of travel stops 150, which, in turn, moves the impeller shroud 40 aft as shown if FIG. 3 to reduce a size of the impeller tip clearance 52.

Conversely, as the gas turbine engine 10 shuts down and the actuation air 68 decreases pressure in the chamber 66, the central flex member 76 contracts and moves the aft rigid member 74 towards the plurality of travel stops 150 which, in turn, moves the impeller shroud 40 forward along the engine axis 11 until the aft rigid member 74 contacts the terminal end 152 of the plurality of travel stops 150 as shown in FIG. 2. In other words, the terminal end 152 of the plurality of travel stops 150 define an axial limit to the forward movement of the impeller shroud 40. The plurality of travel stops 150 prevent the impeller shroud 40 from moving beyond a max forward axial position when the gas turbine engine 10 is starting up, shutting down or if actuation air 68 pressure decreases dramatically during the gas turbine engine 10 operation so that the impeller tip clearance 52 doesn't increase beyond a max limit.

In the illustrative embodiment, as shown if FIG. 2, the plurality of travel stops 150 comprise a plurality of stop bolts 154 that are located circumferentially around the engine axis 11 and extend thru and are threadedly coupled to the forward rigid member 72 of the air piston 64 and extend into the chamber 66. Each of the plurality of stop bolts 154 comprise a bolt head 156 and a bolt shank 158 that defines a terminal end 152 located at the end of the bolt shank 158 opposite the bolt head 156. The terminal end 152 of each of the plurality of stop bolts 154 is designed to terminate in a desired axial plane of the gas turbine engine 10 so that the axial forward most position of the impeller shroud 40 is limited to a predetermined position.

When the gas turbine engine 10 is not operating, the aft rigid member 74 abuts the terminal end 152 of the plurality of stop bolts 154 to prevent the chamber 66 from fully deflating and, thereby, locates the impeller shroud 40 axially at the predetermined axial location as shown in FIG. 2. In response to the gas turbine engine 10 starting up, the actuation air 68 increases pressure in the chamber 66, the central flex member 76 flexes and moves the aft rigid member 74 away from the terminal end 152 of the plurality of stop bolts 154, which, in turn, moves the impeller shroud 40 aft along the engine axis 11 as shown in FIG. 3. During operation, the clearance control system 60 may selectively increase and decrease air pressure in the chamber 66 to control the impeller tip clearance 52.

In response to the gas turbine engine 10 shutting down, the actuation air 68 decreases pressure in the chamber 66, the central flex member 76 contracts and moves the aft rigid member 74 towards the plurality of stop bolts 154, which in turn, moves the impeller shroud 40 forward along the engine axis 11 until the aft rigid member 74 comes into abutting contact with the terminal end 152 of the plurality of stop bolts 154. The plurality of stop bolts 154 prevent the impeller shroud 40 from moving beyond the max forward axial position The plurality of stop bolts 154 may be threadedly connected directly to the forward rigid member 72 through a plurality of threaded thru holes 174 in the forward rigid member 72 as shown in FIG. 2. The plurality of stop bolts 154 may also be threadedly connected directly to the forward rigid member 72 through a plurality of threaded inserts 176 that are inserted into the plurality of threaded thru holes 174 in the forward rigid member 72 as shown in FIG. 3.

The plurality of travel stops 150 may comprise a plurality of stop bolts 154 and a plurality of shims 180. The plurality of stop bolts 154 and plurality of shims 180 are located circumferentially around the engine axis 11 and extend thru and are threadedly coupled to the forward rigid member 72 of the air piston 64 and extend into the chamber 66. Each of the plurality of stop bolts 154 comprise a bolt head 156 and a bolt shank 158 that defines a terminal end 152 located at the end of the bolt shank 158 opposite the bolt head 156. Each of the plurality of shims 180 is located in between the bolt head 156 and the forward rigid member 72 for each of the plurality of stop bolts 154. The terminal end 152 of each of the plurality of stop bolts 154 is designed to terminate in a desired axial plane of the gas turbine engine 10 so that the axial forward most position of the impeller shroud 40 is limited to a predetermined position.

The plurality of stop bolts 154 and plurality of shims 180 may be threadedly connected directly to the forward rigid member 72 through a plurality of threaded thru holes 174 in the forward rigid member 72. The plurality of stop bolts 154 and plurality of shims 180 may also be threadedly connected directly to the forward rigid member 72 through a plurality of threaded inserts 176 that are inserted into the plurality of threaded thru holes 174 in the forward rigid member 72. In another embodiment, at least one of the plurality of shims 180 has a thickness T different than the thickness T of the remaining plurality of shims 180.

In another embodiment as illustrated in FIGS. 4 and 5, the plurality of travel stops 150 may include a plurality of locating bosses 182 that are located circumferentially around the engine axis 11 and that extend into the chamber 66 of the air piston 64 from the forward rigid member 72. Each of the plurality of locating bosses 182 comprise a terminal end 186 located in a desired axial plane of the gas turbine engine 10.

When the gas turbine engine 10 is not operating, the aft rigid member 74 abuts the terminal end 186 of the plurality of locating bosses 182 to prevent the chamber 66 from fully deflating and, thereby, locates the impeller shroud 40 axially at the predetermined axial location as shown in FIG. 4. In response to the gas turbine engine 10 starting up, the actuation air 68 increases pressure in the chamber 66, the central flex member 76 flexes and moves the aft rigid member 74 away from the terminal end 186 of each of the plurality of locating bosses 182, which in turn, moves the impeller shroud 40 aft along the engine axis 11 as shown in FIG. 5. During operation, the clearance control system 60 may selectively increase and decrease air pressure in the chamber 66 to control the impeller tip clearance 52.

In response to the gas turbine engine 10 shutting down, the actuation air 68 decreases pressure in the chamber 66, the central flex member 76 contracts and moves the aft rigid member 74 towards the plurality of locating bosses 182, which in turn, moves the impeller shroud 40 forward along the engine axis 11 until the aft rigid member 74 comes into abutting contact with the terminal end 186 of each of the plurality of locating bosses 182. The plurality of locating bosses 182 prevent the impeller shroud 40 from moving beyond the max forward axial position when the gas turbine engine 10 is operating.

In another embodiment, the plurality of travel stops 150 described above, may be utilized with a passive tip clearance control system 190 as shown in FIG. 6 to prevent the impeller shroud 40 from moving beyond the max forward axial position when the gas turbine engine 10 is operating. The passive tip clearance control system 190 does not selectively control the impeller tip clearance 52 during the gas turbine engine 10 operation. Instead, the passive tip clearance control system 190 utilizes the gas turbine engine 10 temperatures and pressures to thermally or pneumatically flex the shroud body 44 and adjust the impeller tip clearance 52 during the gas turbine engine 10 operation. As shown if FIG. 6, the shroud body 44 may comprise a U-shaped member 192 and a plurality of travel stops 150.

This disclosure allows for the shroud assembly 26 to be assembled with a max impeller tip clearance 52 at cold built between the impeller shroud 40 and the plurality of impeller blade tips 35. The plurality of travel stops 150 may allow a desired max impeller tip clearance 52 at cold build to be archived and changed during the building of the gas turbine engine 10 and at overhaul of the gas turbine engine 10.

In one method, during the building of the shroud assembly 26, the plurality of travel stops 150 may include a plurality of stop bolts 154 that may be partially installed onto the air piston 64 by inserting the plurality of stop bolts 154 into the chamber 66 through the plurality of threaded thru holes 174 in the forward rigid member 72 and engaging the threads of the plurality of threaded thru holes 174 such that the plurality of stop bolts 154 are threadedly coupled to the forward rigid member 72 and the distal end 152 of each of the plurality of stop bolts 154 abuts the aft rigid member 74. Each of the plurality of stop bolts 154 may then be further threaded a set amount into the forward rigid member 72, which in turn flexes the central flex member 76 and moves the aft rigid member 74 away from the forward rigid member 72. This is repeated until each of the plurality of stop bolts are fully installed into the forward rigid member 72 and thus, the aft rigid member is at the desired axial location.

The plurality of stop bolts 154 prevent the central flex member 76 from unflexing any further, thus preventing the forward rigid member 72 and aft rigid member 74 from moving any closer to each other. The impeller shroud 40 may be rigidly attached to the aft rigid member 74 of the shroud assembly 26 before or after the plurality of stop bolts 154 are installed as described above. The shroud assembly 26 may then be installed in the gas turbine engine 10 and measurements of the impeller tip clearance 52 at cold build may be taken.

In another method, during the building of the shroud assembly 26, the plurality of travel stops 150 may include a plurality of stop bolts 154 and a plurality of shims 180 that may be partially installed onto the air piston 64 by inserting the plurality of stop bolts 154 into the chamber 66 through the plurality of threaded thru holes 174 in the forward rigid member 72 and engaging the threads of the plurality of threaded thru holes 174 such that the plurality of stop bolts 154 are threadedly coupled to the forward rigid member 72 and each of the plurality of shims 180 is located between the bolt head 156 and the forward rigid member 72 for each of the plurality of stop bolts 154. Each of the plurality of stop bolts 154 may be inserted into the chamber 66 until the distal end 152 of each of the plurality of stop bolts 154 abuts the aft rigid member 74. Each of the plurality of stop bolts 154 may then be further threaded, a set amount into the forward rigid member 72, which in turn flexes the central flex member 76 and moves the aft rigid member 74 away from the forward rigid member 72. This is repeated until each of the plurality of stop bolts 154 are fully installed into the forward rigid member 72 such that each of the plurality of shims 180 abut both the bolt head 156 and the forward rigid member 72 for each of the plurality of stop bolts 154 and thus, the aft rigid member is at the desired axial location.

The plurality of stop bolts 154 prevent the central flex member 76 from unflexing any more, thus preventing the forward rigid member 72 and aft rigid member 74 from moving any closer to each other. The impeller shroud 40 may be rigidly attached to the aft rigid member 74 of the shroud assembly 26 before or after the plurality of stop bolts 154 and the plurality of shims 180 are installed as described above. The shroud assembly 26 may then be installed in the gas turbine engine 10 and measurements of the impeller tip clearance 52 at cold build may be taken.

In either of the above methods, if the measurement of the impeller tip clearance 52 is not as desired, the following method may be used to adjust the impeller tip clearance 52 at cold build. The shroud assembly 26 may be removed from the gas turbine engine 10. The impeller shroud 40 may be removed from the aft rigid member 74 of the shroud assembly 26. Each of the plurality of stop bolts 154 may then be unthreaded a set amount out of the forward rigid member 72, which in turn unflexes the central flex member 76 and moves the aft rigid member 74 towards the forward rigid member 72. This is repeated until the distal end 152 of each of the plurality of stop bolts 154 is no longer in abutting contact with the aft rigid member 74. Each of the plurality of stop bolts 154 may then be fully removed from the forward rigid member 72.

To change the impeller tip clearance 52 at cold build, a plurality of new stop bolts 154 with a different bolt shank 158 length may be installed using any of the above mentioned methods to assemble the shroud assembly 26. Another example to change the impeller tip clearance 52 at cold build, a plurality of the original stop bolts 154 and a plurality of new shims 180 may be installed using any of the above mentioned methods to assemble the shroud assembly 26. Another example to change the impeller tip clearance 52 at cold build, a plurality of the new stop bolts 154 with a different bolt shank 158 length and a plurality of new shims 180 may be installed using any of the above mentioned methods to assemble the shroud assembly 26. The above methods to assemble the shroud assembly 26 and adjust the impeller tip clearance 52 at cold build may be done during the gas turbine engine 10 assembly and at any of the gas turbine engine 10 overhauls.

This disclosure may be used, for example, when a gas turbine engine 10 uses an active clearance control system 60, such as an air piston 64, to actively control the impeller tip clearance 52 between an impeller shroud 40 and the impeller blade tips 35 of a centrifugal compressor 15. The travel stops 150 may be engaged during the gas turbine engine 10 start up and shut down when the actuation air 68 for the clearance control system 60 may not have enough pressure to prevent the impeller shroud 40 from axially backing away from the impeller 24 and opening up the impeller tip clearance 52 greater than desired. This would allow more air than desired to bypass the centrifugal compressor 150 by going over the top of the impeller blade tips 35 in this greater than desired impeller tip clearance 52 between the impeller blade tips 35 and the impeller shroud 40.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A compressor assembly for a gas turbine engine, the compressor assembly comprising:

an impeller arranged around an axis and configured to rotate about the axis to provide compressed air, a shroud arranged circumferentially around the impeller to direct the compressed air through the impeller, the shroud being spaced axially and radially apart from the impeller to define a gap therebetween, an outer case that is fixed relative to the axis, and an air piston actuator coupled with the outer case and the shroud to selectively vary a position of the shroud axially relative to the impeller, the air piston actuator includes a mount arm, an actuator body, and a travel stop, the mount arm being fixedly coupled with the outer case, the actuator body includes bellows coupled with the mount arm and the shroud and configured to move the shroud axially relative to the impeller and adjust a size of the gap, and the bellows defines a chamber adapted to be selectively pressurized and depressurized to control axial expansion and contraction of the bellows, wherein the travel stop is coupled with the mount arm and extends axially into the chamber defined by the bellows and has an axial terminal end configured to engage the bellows and limit the contraction of the bellows beyond a predetermined axial distance so that a maximum size of the gap between the shroud and the impeller is not exceeded when the chamber is depressurized.

2. The compressor assembly of claim 1, wherein the travel stop comprises a bolt that is threadedly coupled with the mount arm and an axial length of the bolt is sized such that the axial terminal end of the bolt is located at a desired axial location relative to the outer case.

3. The compressor assembly of claim 2, wherein the bolt includes a bolt shank and a bolt head, the bolt shank extends through the mount arm and into the chamber and is coupled to the mount arm, the bolt head engages the mount arm and positions the bolt axially, and the bolt shank further defines the axial terminal end of the bolt that engages the bellows in response to the chamber being depressurized.

4. The compressor assembly of claim 3, wherein the travel stop further includes a shim positioned between the bolt head and the mount arm to adjust an axial location of the axial terminal end of the bolt.

5. The compressor assembly of claim 1, wherein the travel stop includes a boss that extends axially away from the mount arm into the chamber and wherein the mount arm and the boss are integrally formed.

6. The compressor assembly of claim 1, wherein the actuator body further includes a mount flange coupled with the bellows, the mount flange extends axially aft away from the bellows and couples with the shroud to couple the air piston actuator with the shroud.

7. The compressor assembly of claim 1, wherein the bellows includes an outer segment and an inner segment that cooperate to form the chamber, the inner segment is U-shaped when viewed circumferentially with a forward axial surface and an aft axial surface which move axially away from or towards each other as the chamber is selectively pressurized and depressurized respectively, and the outer segment is an inverted U-shaped when viewed circumferentially with a forward axial surface and an aft axial surface which move axially away from or towards each other as the chamber is selectively pressurized and depressurized respectively.

8. A compressor assembly for a gas turbine engine, the compressor assembly comprising:

an outer case that is fixed relative to an axis, a shroud arranged circumferentially around the axis to direct compressed air through an impeller, and an actuator coupled with the outer case and the shroud to vary a position of the shroud axially relative to the outer case, the actuator includes a mount arm, an actuator body, and a travel stop, the mount arm coupled with the outer case, the actuator body coupled with the mount arm and the shroud, the actuator body defines a chamber adapted to be selectively pressurized and depressurized to control axial movement of the shroud relative to the outer case, and the travel stop is coupled to the mount arm and extends away from the mount arm and configured to limit a forward-most axial position of the shroud relative to the outer case, wherein the travel stop engages the actuator body when the chamber is depressurized to limit the forward-most axial position of the shroud.

9. The compressor assembly of claim 8, wherein the actuator body includes a bellows configured to expand and contract in response to the actuator body being pressurized and depressurized.

10. The compressor assembly of claim 9, wherein the bellows includes an outer segment and an inner segment that cooperate to form the chamber, the inner segment is U-shaped when viewed circumferentially with a forward axial surface and an aft axial surface which move axially away from or towards each other as the chamber is selectively pressurized and depressurized respectively, and the outer segment is an inverted U-shaped when viewed circumferentially with a forward axial surface and an aft axial surface which move axially away from or towards each other as the chamber is selectively pressurized and depressurized respectively.

11. The compressor assembly of claim 8, wherein the travel stop extends axially through the mount arm and into the chamber to engage the actuator body when the chamber is depressurized to limit the forward-most axial position of the shroud.

12. The compressor assembly of claim 11, wherein the travel stop comprises a plurality of bolts, each bolt comprises a bolt shank, a bolt head, and a terminal end, the bolt shank extends through the mount arm and into the chamber and is coupled to the mount arm, the bolt head engages the mount arm and positions the bolt axially, and the terminal end of the bolt engages the bellows when the chamber is depressurized to limit the forward most forward-most axial position of the shroud.

13. The compressor assembly of claim 12, wherein each of the plurality of bolts further comprises a shim, the shim is trapped between the bolt head and the mount arm and positions the bolt axially such that the terminal end of the bolt engages the bellows when the chamber is depressurized to limit the forward-most axial position of the shroud.

14. The compressor assembly of claim 8, wherein the actuator body includes an air piston.

15. A method of assembling a compressor shroud assembly, the method comprising:

providing a compressor assembly that includes an outer case arranged circumferentially around an axis and an actuator coupled with the outer case and including an actuator body and a travel stop, wherein the travel stop comprises a plurality of stop bolts that are inserted through the actuator body, and engaging the actuator body with the plurality of stop bolts at a predetermined location such that the plurality of stop bolts limit the contraction of the actuator body.

16. The method of claim 15, further comprising arranging the outer case and the shroud assembly around an impeller, measuring a size of a gap between the impeller and the shroud assembly, and adjusting the gap by inserting a plurality of shims between the travel stop bolts and the actuator body.

17. The method of claim 15, further comprising arranging the outer case and shroud assembly around an impeller, measuring a size of a gap between the impeller and shroud assembly, and adjusting the gap by removing the travel stop bolts and inserting a plurality of second travel stop bolts with a different terminal end axial location.

* * * * *